United States Patent
Lee et al.

(10) Patent No.: US 12,026,487 B2
(45) Date of Patent: Jul. 2, 2024

(54) METHOD FOR OPTIMIZING PROGRAM USING REINFORCEMENT LEARNING

(71) Applicant: MOREH CORP., Seoul (KR)

(72) Inventors: Jaejin Lee, Seoul (KR); Wookeun Jung, Seoul (KR)

(73) Assignee: MOREH CORP., Seoul (KR)

( * ) Notice: Subject to any disclaimer, the term of this patent is extended or adjusted under 35 U.S.C. 154(b) by 49 days.

(21) Appl. No.: 17/853,028

(22) Filed: Jun. 29, 2022

(65) Prior Publication Data

US 2022/0326922 A1    Oct. 13, 2022

Related U.S. Application Data

(63) Continuation of application No. PCT/KR2020/019345, filed on Dec. 29, 2020.

(30) Foreign Application Priority Data

Dec. 30, 2019  (KR) .................. 10-2019-0177761
Dec. 16, 2020  (KR) .................. 10-2020-0176308

(51) Int. Cl.
    *G06F 11/36*    (2006.01)
    *G06F 8/41*    (2018.01)
    (Continued)

(52) U.S. Cl.
    CPC .............. *G06F 8/443* (2013.01); *G06N 20/00* (2019.01); *G06F 8/30* (2013.01); *G06F 8/35* (2013.01); *G06F 8/77* (2013.01)

(58) Field of Classification Search
CPC ... G06F 8/443; G06F 8/30; G06F 8/35; G06F 8/77; G06N 20/00; G06N 3/08
See application file for complete search history.

(56) References Cited

U.S. PATENT DOCUMENTS 10,157,045 B2    12/2018   Venkataramani et al.
11,373,088 B2 *   6/2022   Bleiweiss .............. G06N 3/044
(Continued)

FOREIGN PATENT DOCUMENTS

KR    10-2016-0125967 A    11/2016
KR    10-2018-0016391 A     2/2018
KR    10-2019-0001183 A     1/2019

OTHER PUBLICATIONS

Kevin Stock et al., Using Machine Learning to Improve Automatic Vectorization, Jan. 2012, [Retrieved on Apr. 8, 2024]. Retrieved from the internet: <URL: https://dl.acm.org/doi/pdf/10.1145/2086696.2086729> 8 Pages (1-23) (Year: 2012).*

*Primary Examiner* — Anibal Rivera
(74) *Attorney, Agent, or Firm* — Banner & Witcoff, Ltd.

(57) ABSTRACT

A method for automatically optimizing a program based on reinforcement learning includes (a) receiving an input for a source program, which includes a fixed parameter and variable parameter, (b) generating the source program based on the received input, (c) converting the source program into an object program, (d) executing the converted object program to measure a performance of the executed object program, (e) inputting the variable parameter and the measured performance into a machine learning model, and outputting a variation of the variable parameter, and (f) regenerating a source program reflecting the variation of the variable parameter.

20 Claims, 9 Drawing Sheets

(51) Int. Cl.
  *G06N 3/04* (2023.01)
  *G06N 3/08* (2023.01)
  *G06N 20/00* (2019.01)
  *G06F 8/30* (2018.01)
  *G06F 8/35* (2018.01)
  *G06F 8/77* (2018.01)

(56) References Cited

U.S. PATENT DOCUMENTS

2015/0248607 A1   9/2015  Sarah et al.
2016/0328649 A1  11/2016  Simm et al.
2017/0249235 A1*  8/2017  Staples ............... G06F 11/3688
2018/0373510 A1  12/2018  Chung et al.
2021/0103434 A1*  4/2021  Venkat ................ G06F 16/2255

* cited by examiner

METHOD FOR OPTIMIZING PROGRAM USING REINFORCEMENT LEARNING

CROSS-REFERENCE TO RELATED APPLICATION

The present application is a continuation of International Patent Application No. PCT/KR2020/019345, filed on Dec. 29, 2020, which is based upon and claims the benefit of priority to Korean Patent Application No. 10-2019-0177761, filed on Dec. 30, 2019 and Korean Patent Application No. 10-2020-0176308, filed on Dec. 16, 2020. The disclosures of the above-listed applications are hereby incorporated by reference herein in their entirety.

TECHNICAL FIELD

The present disclosure relates to a method for optimizing a program based on reinforcement learning. Specifically, one or more examples of the disclosure relate to a method for automatically optimizing a program based on reinforcement learning which continuously enhances program performance, and a computer program.

BACKGROUND

It may be important to optimize a computer program to perform various program executions or tasks with limited assets, energy, resources, and the like. Optimization of a program herein may refer to a series of processes of changing a given program such that the program outputs the same result with higher performance for a given input.

In general, the optimization of a program can be performed by modifying, compiling, and executing the program several times by an experienced programmer who understands both the hardware system and the structure of the program. However, such a series of processes requires a cost for hiring an experienced programmer and may also take a long time.

SUMMARY

In order to solve one or more problems (e.g., the problems described above and/or other problems not explicitly described herein), the present disclosure provides a method for automatically optimizing a program based on reinforcement learning and a non-transitory computer-readable recording medium storing instructions.

The present disclosure may be implemented in a variety of ways, including a method, a system, an apparatus, a non-transitory computer-readable recording medium storing instructions, or a computer program.

A method for automatically optimizing a program based on reinforcement learning may include (a) receiving an input for a source program, which may include a fixed parameter and variable parameter, (b) generating the source program based on the received input, (c) converting the source program into an object program, (d) executing the converted object program to measure a performance of the executed object program, (e) inputting the variable parameter and the measured performance into a machine learning model, and outputting a variation of the variable parameter, and (f) regenerating a source program reflecting the variation of the variable parameter.

The step (f) may include applying the variation of the variable parameter to the variable parameter, and outputting the regenerated source program by using the variable parameter applied with the variation of the variable parameter and the fixed parameter.

After the step (f), the method may further include (g) setting the regenerated source program as the source program, and performing the steps (c) to (f) again.

The method may further include training the machine learning model by repeatedly performing the step (g) until a predetermined batch size is reached.

The method may further include performing the steps (c) to (f), while repeatedly performing at least some of the steps (c) to (f) until a target performance is reached, and determining a source program corresponding to a best performance to be an optimized source program when the target performance is reached.

The step (d) may include inputting the variable parameter, the measured performance, and the source program to the machine learning model and outputting the variation of the variable parameter.

The machine learning model may include a deep learning model. The step of inputting the variable parameter, the measured performance, and the source program to the machine learning model and outputting the variation of the variable parameter includes generating an input vector representing the variable parameter, the measured performance, and the source program, and inputting the generated input vector to the deep learning model to generate an output vector representing the variation of the variable parameter through the deep learning model.

The step (d) may include measuring time taken to output a result value through the object program when the object program is executed, and determining the measured time to be an index of the performance.

The step of measuring time taken to output a result value through the object program when the object program is executed may include inputting a test set for the object program, and determining time taken for a result value corresponding to the test set to be output through the object program to be an index of the performance.

There is provided a non-transitory computer-readable recording medium storing instructions for executing, on a computer, a method for automatically optimizing a program based on reinforcement learning described above.

According to some examples of the present disclosure, the processor may automatically change the variable parameter to generate an optimized source program from a given source program, without requiring a programmer of the program to change or modify the variable parameter directly each time the optimization of the performance of the program is performed.

According to some examples of the present disclosure, since the processor can play a role of the experienced programmer, compared to the direct optimization by the programmer, program optimization can be completed in a shorter time, or a larger number of search ranges can be efficiently explored in a given amount of time.

According to some examples of the present disclosure, if program optimization is performed, the amount of input of human resources required for the program optimization can be minimized, thus producing profits, and a program with enhanced performance can be used to enhance service quality.

According to some examples of the present disclosure, it may be possible to automatically generate an optimized program by repeatedly performing the performance measurement until the processor reaches the target performance, without requiring a program developer to optimize the program by directly changing variable parameters.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

Figure 1:
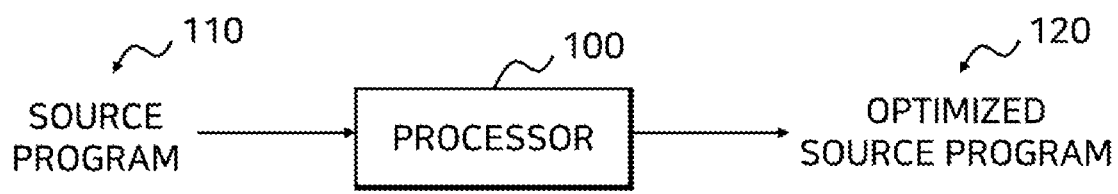
FIG. 1 is a diagram illustrating an example in which a processor generates an optimized source program.

Hereinafter, example details for the practice of the present disclosure will be described in detail with reference to the accompanying drawings. However, in the following description, detailed descriptions of well-known functions or configurations will be omitted when it may make the subject matter of the present disclosure rather unclear.

In the accompanying drawings, the same or corresponding components are assigned the same reference numerals. In addition, in the following description of various examples, duplicate descriptions of the same or corresponding components may be omitted. However, even if descriptions of components are omitted, it is not intended that such components are not included in any embodiment.

Advantages and features of the disclosed examples and methods of accomplishing the same will be apparent by referring to examples described below in connection with the accompanying drawings. However, the present disclosure is not limited to the examples disclosed below, and may be implemented in various forms different from each other, and the examples are merely provided to make the present disclosure complete, and to fully disclose the scope of the invention to those skilled in the art to which the present disclosure pertains.

The terms used herein will be briefly described prior to describing the disclosed embodiment(s) in detail. The terms used herein have been selected as general terms which are widely used at present in consideration of the functions of the present disclosure, and this may be altered according to the intent of an operator skilled in the art, conventional practice, or introduction of new technology. In addition, in specific cases, certain terms may be arbitrarily selected by the applicant, and the meaning of the terms will be described in detail in a corresponding description of the embodiment(s). Therefore, the terms used in the present disclosure should be defined based on the meaning of the terms and the overall content of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it intends to mean that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to reproduce one or more processors. Accordingly, as an example, the "module" or "unit" may include components such as software components, object-oriented software components, class components, and task components, and at least one of processes, functions, attributes, procedures, subroutines, program code segments, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

The "module" or "unit" may be implemented as a processor and a memory. The "processor" should be interpreted broadly to encompass a general-purpose processor, a central processing unit (CPU), a microprocessor, a digital signal processor (DSP), a controller, a microcontroller, a state machine, and so forth. Under some circumstances, the "processor" may refer to an application-specific integrated circuit (ASIC), a programmable logic device (PLD), a field-programmable gate array (FPGA), and so on. The "processor" may refer to a combination of processing devices, e.g., a combination of a DSP and a microprocessor, a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, and so on. The memory is said to be in electronic communication with a processor if the processor can read information from and/or write information to the memory. The memory integrated with the processor is in electronic communication with the processor.

In the present disclosure, "automatically optimizing a program" or "optimization of a program" may refer to a series of processes of changing a given program such that the program outputs the same result with higher performance for a given input.

In the present disclosure, the "performance" may be defined variously according to types and execution environments of the programs, using for example, execution time, energy consumption, amount of resource usage, and the like as an index for determining the performance of the program. For example, the performance may be determined based on time taken to output a result value corresponding to a test input through a given program in response to the test input to that program.

In the present disclosure, the "program" may refer to a program executed in CPU (e.g., C program, Java program, Python program, and the like), a program executed in GPU (e.g., Open CL, CUDA, and the like), and/or all software executed in hardware other than the CPU and GPU.

In the present disclosure, a "fixed parameter" and a "variable parameter" may include some or all information necessary to configure one program, and may be embodied in various forms according to a method of generating or implementing a program. According to an embodiment, the fixed parameter may refer to a predefined basic (skeleton) code required to construct a given program, and the variable parameter may represent a numerical value of a part of a source program that can be implemented differently. For example, a skeleton code using a large number of C macro variables may be defined as the fixed parameter, and a set of C macro variable declarations may be defined as the variable parameter. As another example, the variable parameter may be defined for each operation in a program, and in the case of a deep learning program, the variable parameter may refer to a parameter determined according to how to implement it when defining a kernel. As another example, the variable parameter may refer to a numerical value indicating how many input values (e.g., pixels) are calculated per one thread of the GPU, how many input values are calculated at one time in a loop, and the like.

FIG. 1 is a diagram illustrating an example in which a processor 100 generates an optimized source program 120. As illustrated, the processor 100 may generate the optimized source program 120 by using a source program 110. In this example, the source program 110 may refer to a source code of a program (e.g., a GPU program) operable in multi-core CPU, GPU, FPGA, or the like. In addition, the optimized source program 120 may refer to a source program (e.g., a program having the best performance) having better performance than the other source programs.

The processor 100 may receive an input for a source program including a fixed parameter and a variable parameter. For example, the fixed parameter may indicate a parameter that is predetermined with fixed in numbers, types, and the like of the parameter, and the variable parameter may indicate a parameter that can be variably changed in numbers, types, and the like of the parameter. If an input to the source program 110 is received, the processor 100 may generate the source program 110 based on the received input.

The processor 100 may convert the source program 110 into an object program. For example, the processor 100 may convert the source program 110 into the object program by using a translator such as a compiler, an interpreter, an assembler, a preprocessor, or the like. In this example, the object program is a form of language that can be immediately executed by a computer, and may refer to a program (e.g., binary code, and the like) generated by translating the source program 110.

The processor 100 may execute the converted object program to measure the performance of the executed object program. For example, the performance of the object program may be measured based on, but is not limited to, an execution time, an amount of energy consumed, an amount of resource usage, and the like required to output the same result, and any performance index that can measure the performance of the program may be used.

The processor 100 may input the variable parameter and the measured performance to the machine learning model, and output a variation of the variable parameter. In this example, the machine learning model may refer to an agent of reinforcement learning that has been or is being trained by reinforcement learning, and for example, may include a deep learning model such as a deep neural network. That is, the processor 100 may output the variation of the variable parameter for the given program from the machine learning model trained to output the variation of the variable parameter that can enhance the performance of the object program.

If the variation of the variable parameter is output, the processor 100 may regenerate the source program reflecting the variation of the variable parameter. That is, the processor 100 may reflect the variation of the variable parameter in the received variable parameter to change the number, type, and the like of the variable parameter. The processor 100 may generate a new source program by using the changed variable parameter and the fixed parameter. In addition, the processor 100 may repeatedly perform the process of converting a new source program into an object program, measuring the performance of the object program, and outputting the variation of the variable parameter based on the changed variable parameter and the measured performance.

As described above, the processor 100 may repeatedly perform the process of measuring the performance of the program, outputting the variation of the variable parameter, and changing the variable parameter according to the output variation of the variable parameter, thereby generating and/or determining the optimized source program 120 having better performance than the other source programs. With such a configuration, the processor 100 may automatically change the variable parameter without requiring a programmer of the program to directly change or modify the variable parameter each time the optimization of the performance of the program is performed, thereby generating the optimized source program 120 from the given source program 110.

Figure 2:
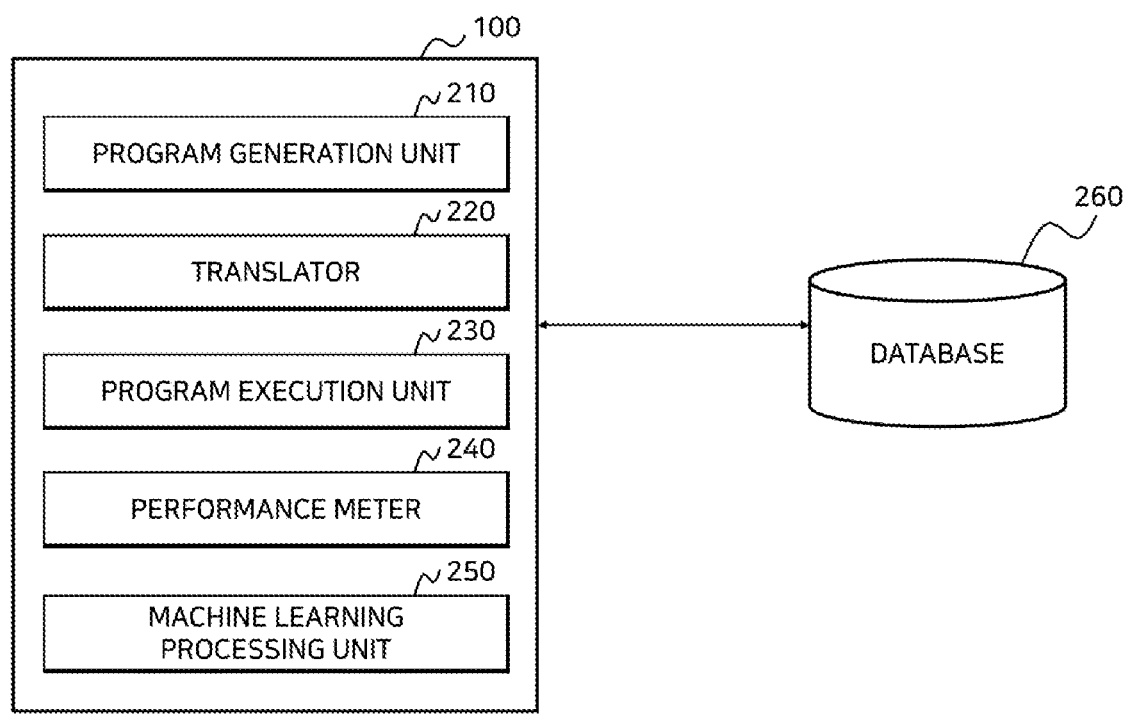
FIG. 2 is a block diagram illustrating an internal configuration of the processor.

FIG. 2 is a block diagram illustrating an internal configuration of the processor 100. As illustrated, the processor 100 may include a program generation unit 210, a translator 220, a program execution unit 230, a performance measurer 240, a machine learning processing unit 250, and the like. In addition, the processor 100 may exchange information and/or data necessary for optimization of the program performance while communicating with a database 260.

As described above, the processor 100 may receive an input for source program including a fixed parameter and a variable parameter. For example, the fixed parameter and the variable parameter may include all information necessary to generate one program. The processor 100 may receive the fixed parameter and the variable parameter from a developer or user of the program, or may extract the fixed parameter and the variable parameter corresponding to a specific program from the database 260.

The program generation unit 210 may generate a source program by using the received or extracted fixed parameter and variable parameter. In this case, the fixed parameter and the variable parameter may be numerical values and/or codes expressed or implemented in a form for the program generation unit 210 to generate a source program. That is, the fixed parameter and the variable parameter may be embodied in various forms according to the implementation method of the program generation unit 210.

The source program generated by the program generation unit 210 may be transmitted to the translator 220. As described above, the translator 220 may include a compiler, an interpreter, an assembler, a preprocessor, and the like, but is not limited thereto. Such a translator 220 may convert a source program into an object program that can be executed in a computer.

The object program converted or generated by the translator 220 may be provided to the program execution unit 230. The program execution unit 230 may receive the object program and a test set for executing the object program. For example, the test set may include a test input and a test output (result data) corresponding to the test input. That is, the program execution unit 230 may be configured to input the test input to the object program and output a result value. In addition, the program execution unit 230 may compare the output result value with the test output to determine whether or not the output result value corresponds to a correct answer (that is, test output).

According to the execution result of the object program, the performance measurer 240 may measure the performance of the object program. For example, if the result of the object program corresponds to the correct answer, the performance measurer 240 may measure the performance of the object program. In another example, if the result of the object program is output, the performance measurer 240 may measure the performance of the object program. In this case, the performance may be measured based on the execution time, the amount of energy consumed, the amount of resource usage, and the like of the object program, but is not limited thereto.

The performance of the object program measured in this way may be provided to the machine learning processing unit 250. The machine learning processing unit 250 may output a variation of the variable parameter using the machine learning model. The machine learning processing unit 250 may extract from the database 260 a machine learning model corresponding to the object program, and input the variable parameter and the measured performance to the extracted machine learning model to output the variation of the variable parameter. That is, the machine learning processing unit 250 may output the variation of the variable parameter such that the performance of the object program can be enhanced. The processor 100 may regenerate the source program reflecting the output variation of the variable parameter.

The processor 100 may repeatedly perform the process of generating a source program, converting the source program into an object program, measuring the performance of the object program, outputting a variation of the variable parameter, and regenerating the source program, thereby progressively enhancing the performance of the corresponding program. This can be regarded as a program optimization process based on reinforcement learning. If the performance of the program reaches the target performance, among a plurality of programs generated until the target performance is reached, the source program corresponding to the best performance may be determined to be the optimized source program.

The database 260 may be included in one device and directly connected to the processor 100. According to another example, the database 260 may be arranged for communication by the processor 100 (e.g., a cloud system).

Although the components of the processor 100 have been described separately for each function in FIG. 2, it does not necessarily mean that they are physically separated. For example, the program execution unit 230 may be configured to include the translator 220 and/or the performance measurer 240. In addition, although FIG. 2 illustrates that there is one database 260, embodiments are not limited thereto, and for example, there may be a database in which fixed parameters and/or variable parameters are stored and a database in which one or more machine learning models are stored. With such a configuration, since the processor 100 can play a role of an experienced programmer, compared to the direct optimization by the programmer, the program optimization can be completed in a shorter time, or a larger number of search ranges (that is, part or all of which is included in the program) can be efficiently explored in a given amount of time.

Figure 3:
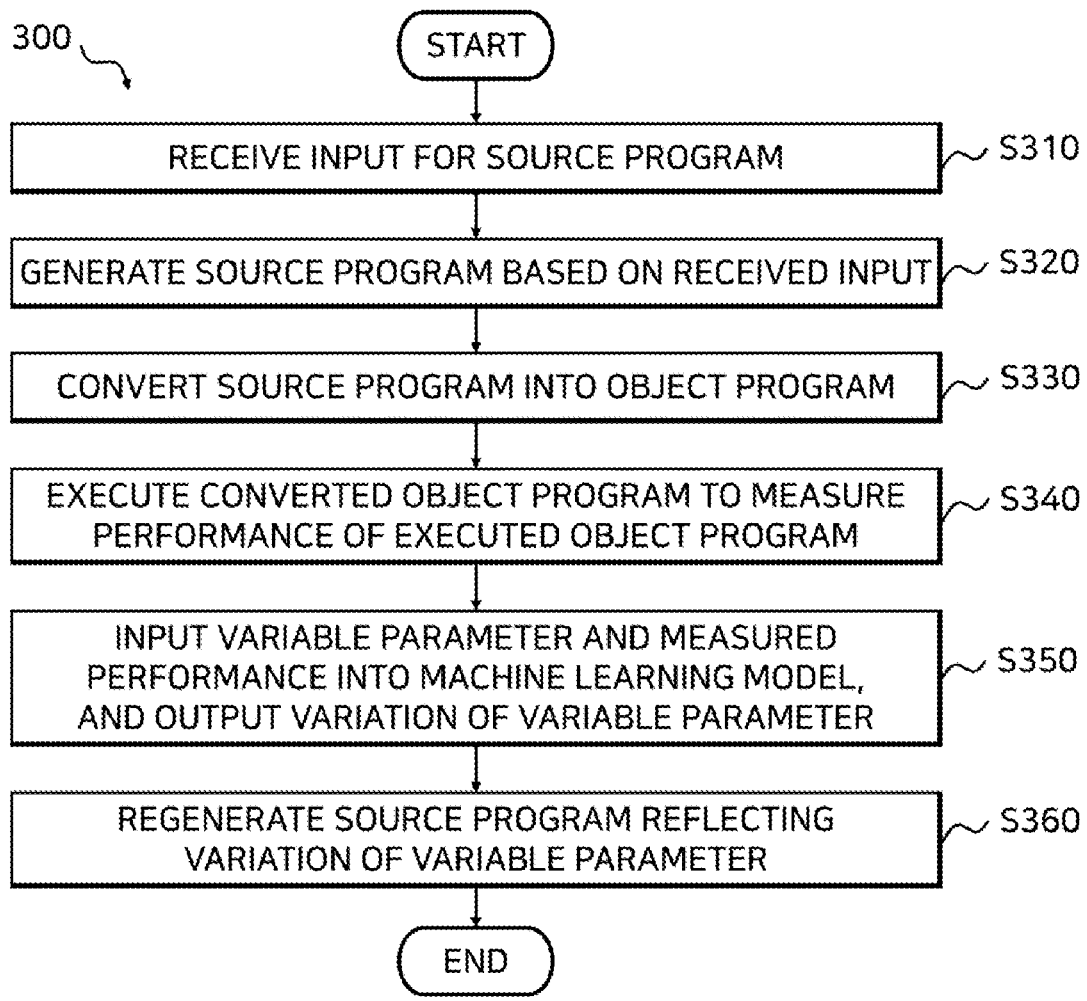
FIG. 3 is a flowchart illustrating an example of a method for automatically optimizing a program based on reinforcement learning.

FIG. 3 is a flowchart illustrating an example of a method 300 for automatically optimizing a program based on reinforcement learning. The method 300 for optimizing a program based on reinforcement learning may be performed by at least one processor (e.g., the processor 100) for performing program optimization. The method 300 for automatically optimizing a program based on reinforcement learning may be initiated by the processor receiving an input for a source program including a fixed parameter and a variable parameter (S310). For example, the source program may refer to a program written in a source language.

The processor may generate the source program based on the received input (S320). In addition, the processor may convert the source program into an object program (S330). For example, the object program may refer to a program written in an object language or a target language, and written such that it can be executed by a computer. For example, the processor may generate the object program using a translator corresponding to the source program.

The processor may execute the converted object program to measure the performance of the executed object program (S340). The processor may measure time taken to output a result value through the object program when the object program is executed, and determine the measured time as an index of performance. In this case, the processor may input a test set for the object program, and determine time taken for a result value corresponding to the test set to be output through the object program as an index of performance of the object program.

The processor may input the variable parameter and the measured performance to the machine learning model, and output a variation of the variable parameter (S350). Additionally or alternatively, the processor may input the variable parameter, the measured performance, and the source program to the machine learning model, and output the variation of the variable parameter. The machine learning model may include a deep learning model such as a deep neural network and the like. If the machine learning model is a deep learning model, the processor may generate an input vector representing the variable parameter, the performance, and the source program, and input the generated input vector to the deep learning model to generate an output vector representing a variation of the variable parameter through the deep learning model.

The processor may regenerate the source program reflecting the variation of the variable parameter (S360). That is, the processor may apply the variation of the variable parameter to the variable parameter and output the regenerated source program by using the variable parameter applied with the variation of the variable parameter and the fixed parameter.

Figure 4:
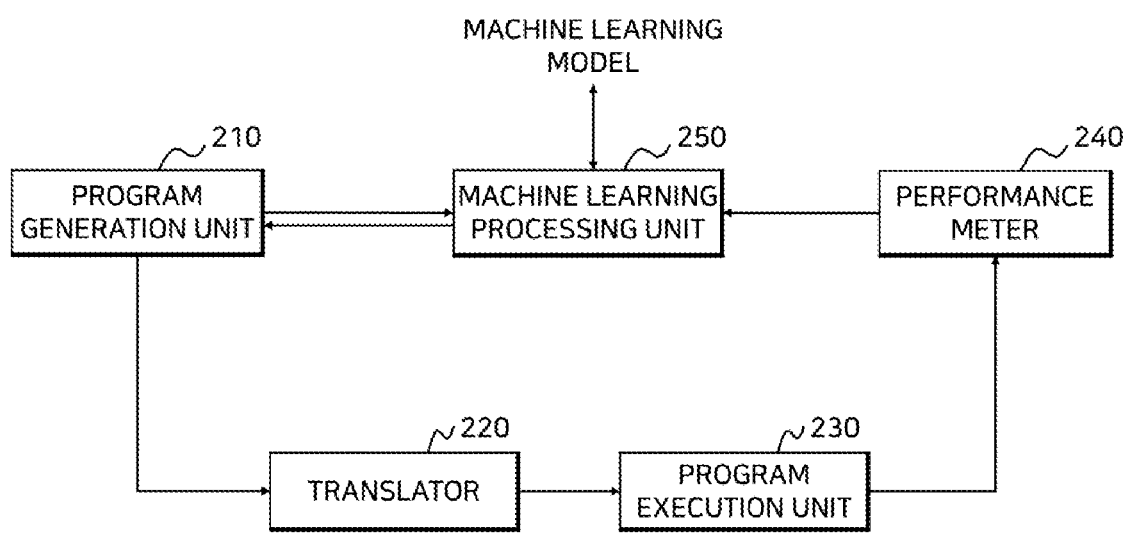
FIG. 4 is a block diagram illustrating an example in which a process for determining an optimized program is repeatedly performed.

FIG. 4 is a block diagram illustrating an example in which a process for determining an optimized program is repeatedly performed. As illustrated, the program generation unit 210 may generate a source program by using the fixed parameter and the variable parameter. For example, the fixed parameter and the variable parameter may include at least some information necessary to generate one program.

The translator 220 may convert the source program generated by the program generation unit 210 into an object program. As described above, the object program converted by the translator 220 may be provided to the program execution unit 230. In this case, the program execution unit 230 may execute the object program to check the output result. In addition, the performance measurer 240 may measure the performance of the object program according to the execution of the object program. In addition, the machine learning processing unit 250 may input the variable parameter and the measured performance to the machine learning model, and output the variation of the variable parameter. As described above, the process and method of generating the source program, converting the source program into the object program, executing the object program, measuring the performance of the object program, and outputting the variation of the variable parameter may be performed in a manner same as/similar to those described above.

In terms of learning the machine learning model, the process described above may be repeatedly performed until a predetermined batch size is reached. In this case, the predetermined batch size may indicate the size or number of data sets required to train the entire machine learning model. That is, a plurality of variations of the variable parameter, a plurality of performances, a plurality of source codes of the program, and the like generated as the process described above is repeated may be stored in a specific memory and/or database, and the like, and when the stored data, such as the plurality of variations of the variable parameter, the plurality of performances, the plurality of source codes of the program, and the like reach a predetermined batch size, the stored data and/or information may be used as training data for training the machine learning model. That is, the result obtained by inferring the machine learning model may be used to train the machine learning model again. For example, a result obtained by inferring a machine learning model may be generated in a plurality of local inference environments and transmitted to a global machine learning model (e.g., a DNN model) to be used for reinforcement learning.

In terms of generation (inference) of the optimized source program, the process described above may be repeatedly executed until the target performance is reached. The target performance may refer to the performance measured when the enhanced performance is no longer measured by repeating the process described above. For example, after a performance-related numerical value is output as 1.6 seconds, if only the performance values of 1.6 seconds or less are output a predetermined number of times (e.g., once or multiple times) in the repeated process), the processor may determine that the target performance is reached. If it is determined that the target performance is reached, the processor may determine a source program corresponding to the best performance to be an optimized source program. In the example described above, a source program generated based on the variable parameter and the fixed parameter when the performance value is 1.6 seconds may be determined to be the optimized source program. With the program optimization performed by the configuration as described above, the amount of human resources required for the program optimization can be minimized, thus producing profits, and a program with enhanced performance can be used to enhance service quality.

Figure 5:
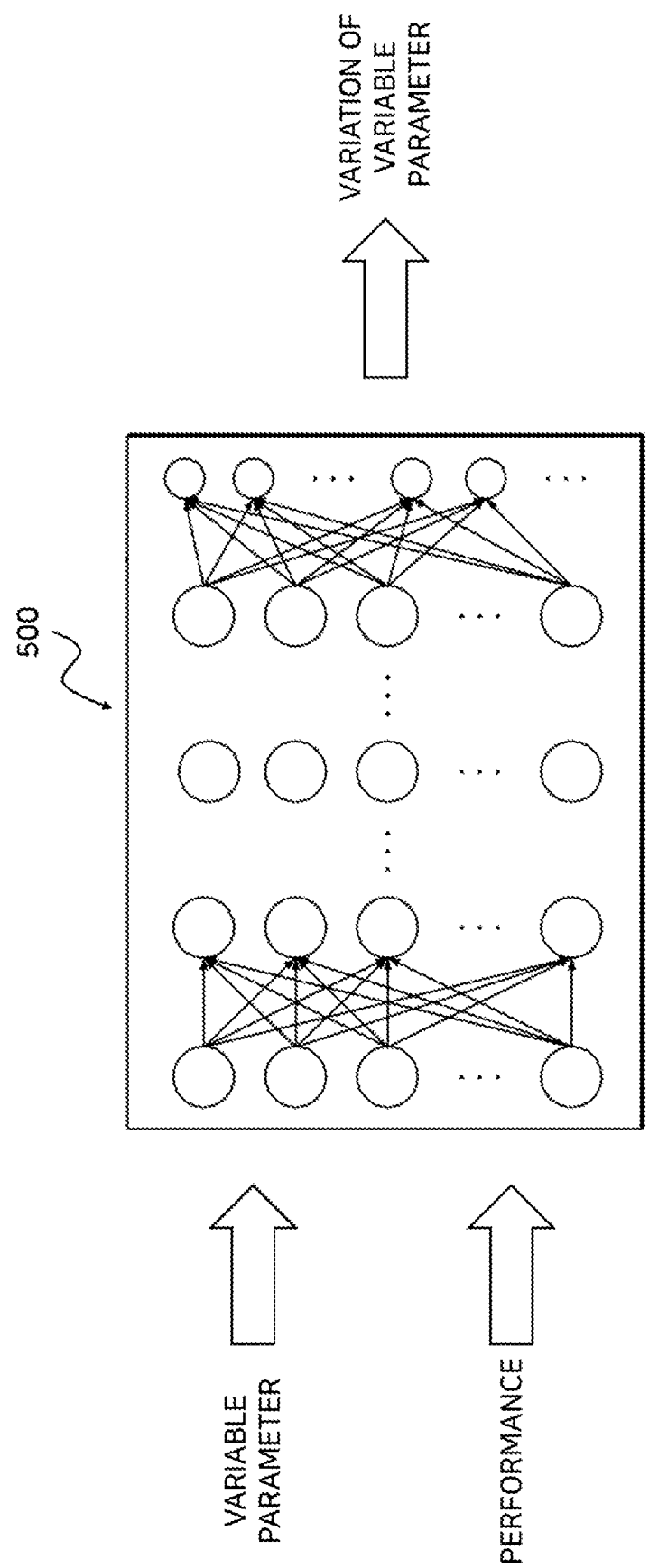
FIG. 5 is a diagram illustrating an example of a machine learning model that outputs a variation of the variable parameter based on reinforcement learning.

FIG. 5 is a diagram illustrating an example of a machine learning model 500 that outputs a variation of the variable parameter based on reinforcement learning. The machine learning model 500 may correspond to an artificial neural network. For example, the artificial neural network may be configured as a deep neural network (DNN). In the machine learning technology and cognitive science, the artificial neural network herein may refer to a statistical training algorithm implemented based on the structure of a biological neural network, or to a structure that executes such algorithm. That is, the artificial neural network represents the machine learning model 500 that acquires a problem solving ability by repeatedly adjusting the weights of synapses by the nodes that are artificial neurons forming the network through synaptic combinations as in the biological neural networks, thus training to reduce errors between a correct output corresponding to a specific input and an inferred output.

In general, the artificial neural network is implemented as a multilayer perceptron (MLP) formed of multiple nodes and connections between them. The artificial neural network may be implemented using one of various artificial neural network structures including the MLP. The artificial neural network may include an input layer that receives an input signal or data from the outside, an output layer that outputs output signal or data corresponding to the input data, and n hidden layers that are located between the input layer and the output layer to receive a signal from the input layer, and extract and deliver features to the output layer. In this case, the output layer receives a signal from the hidden layer and outputs it to the outside.

The processor may input the variable parameters and the performance of the program to the machine learning model 500 and output the variation of the variable parameter. The processor may generate an input vector representing the variable parameter and the measured performance, and input the generated input vector to the machine learning model 500, and generate an output vector representing the variation of the variable parameter through the machine learning model 500. In this case, the variation of the variable parameter may be any value output to enhance the performance of a given program. That is, the processor may apply the variation of the variable parameter to the existing variable parameter, and output a new source program by using the variable parameter applied with the variation of the variable parameter and the fixed parameter.

Figure 6:
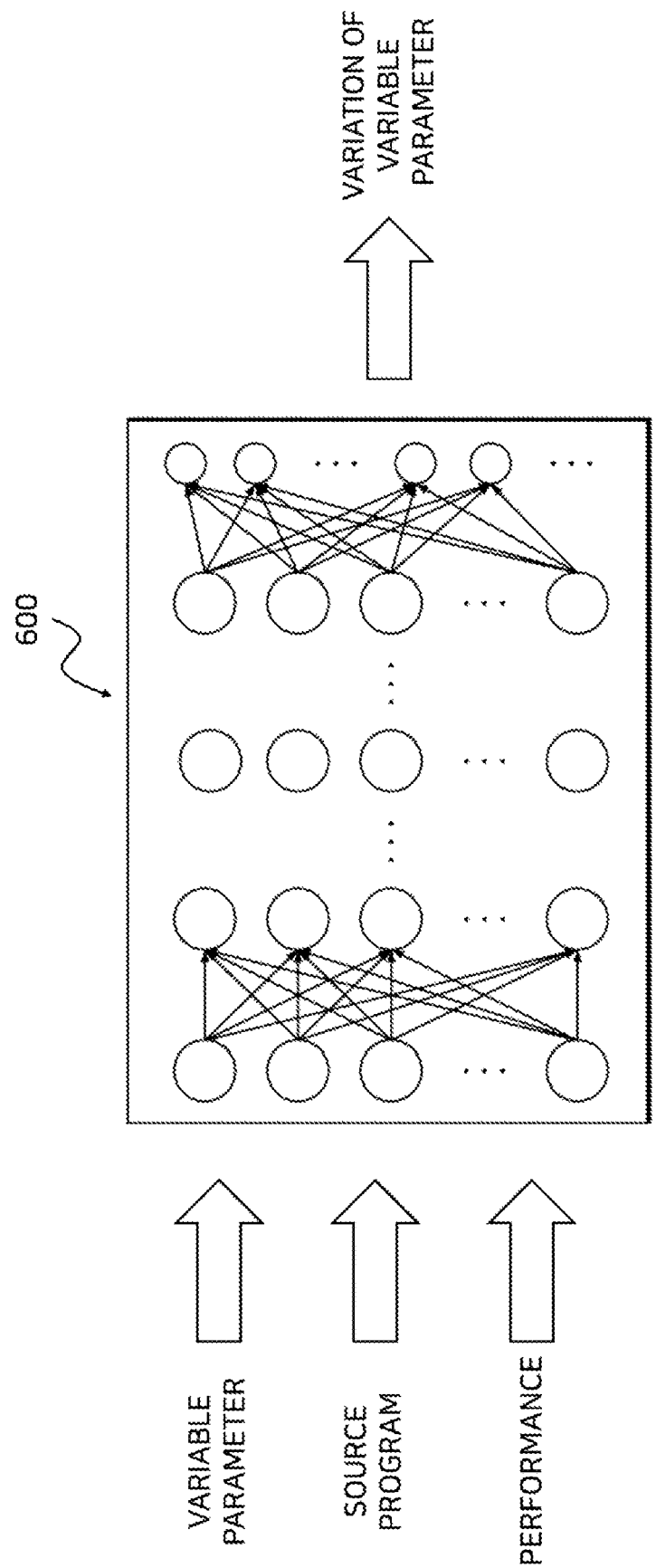
FIG. 6 is a diagram illustrating an example of a machine learning model that outputs a variation of the variable parameter based on reinforcement learning.

FIG. 6 is a diagram illustrating an example of a machine learning model 600 that outputs a variation of the variable parameter based on reinforcement learning. The machine learning model 600 may correspond to an artificial neural network. For example, the machine learning model 600 may include an input layer, a hidden layer, an output layer, and the like implemented as a multi-layer perceptron, and may include a deep neural network (DNN) and the like, for example.

The machine learning model 600 may be a model trained (e.g., with reinforcement learning) to output a variation of the variable parameter using a variable parameter, a program performance, a source program, and the like. In this case, the variation of the variable parameter output by the machine learning model 600 from the variable parameter, program performance, source program, and the like may be used as new training data for training the machine learning model 600.

The processor may input the variable parameter, the performance of the program, and the source program to the machine learning model 600, and output the variation of the variable parameter. For example, the processor may generate an input vector representing the variable parameter and the measured performance, and the source program, and input the generated input vector to the machine learning model 600, and generate an output vector representing the variation of the variable parameter through the machine learning model 600. That is, the processor may apply the output vector indicating the variation of the variable parameter to the existing variable parameter, and output a new source program by using the variable parameter applied with the output vector indicating the variation of the variable parameter and the fixed parameter.

Figure 7:
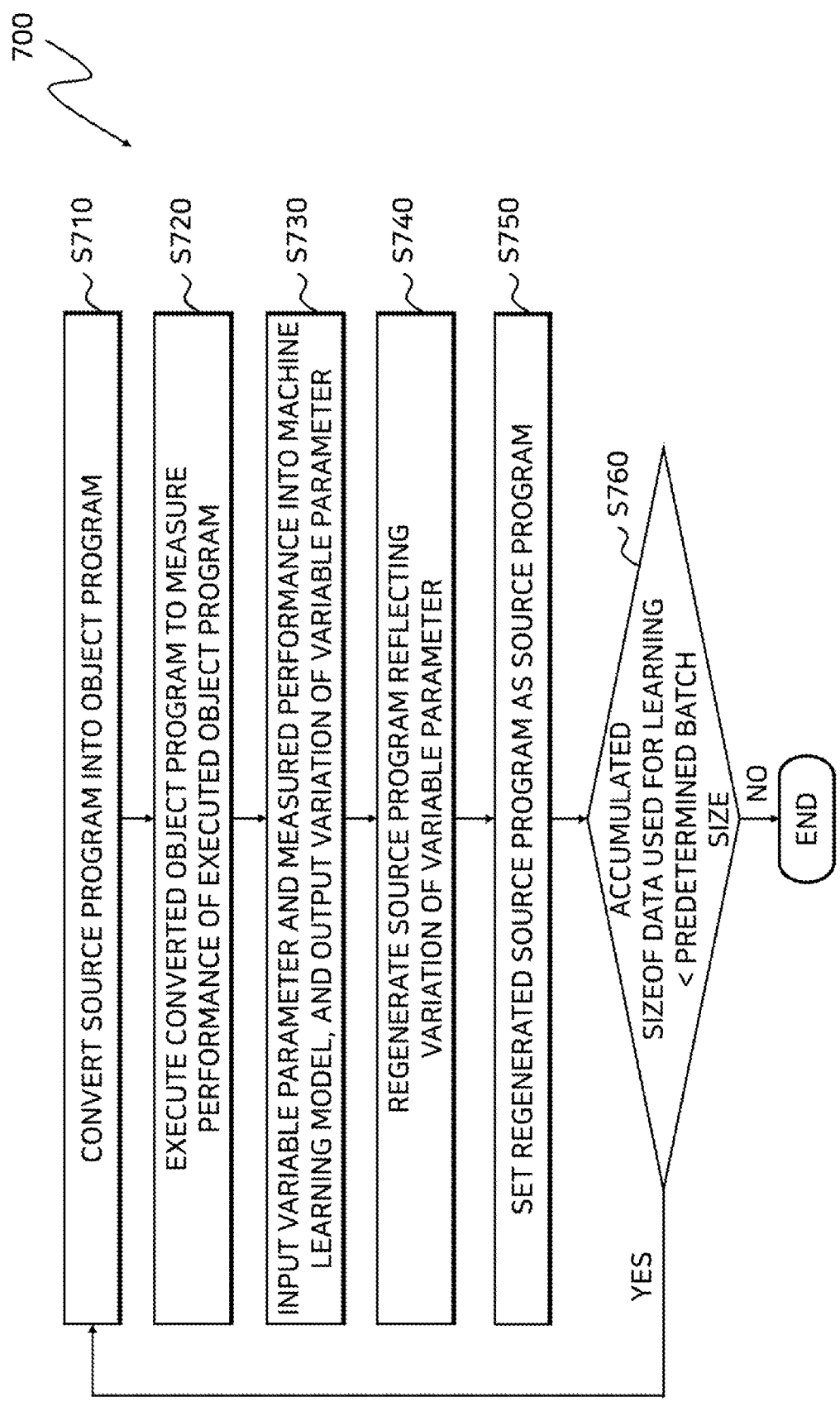
FIG. 7 is a flowchart illustrating an example of a method for training a machine learning model based on reinforcement learning.

FIG. 7 is a flowchart illustrating an example of a method 700 for training a machine learning model based on reinforcement learning. The method 700 for training a machine learning model based on reinforcement learning may be performed by at least one processor (e.g., the processor 100) for performing program optimization or generating training data. The method 700 may be initiated by the processor converting a source program into an object program (S710). The source program may be generated using fixed parameter and variable parameter including all information necessary for generating the corresponding program. In this case, the variable parameter may be received from a programmer or a database. Alternatively, the variable parameter may refer to an existing variable parameter applied with the variation of the variable parameter.

The processor may execute the converted object program to measure the performance of the executed object program (S720). The processor may receive a predefined test set (test input and test output) according to an object program. The processor may input the test input to the object program and check the output result value. That is, the processor may check whether or not the output result value and the test output are the same as each other, and measure the performance of the object program. For example, if the output result value and the test output are not the same as each other (e.g., since it means that the modified source program is different from the existing source program), the processor may initialize the variable parameter to a default value.

The processor may input the variable parameter and the measured performance to the machine learning model and output the variation of the variable parameter (S730). In addition, the processor may regenerate the source program reflecting the variation of the variable parameter (S740). For example, the processor may output the variation of the variable parameter so that the performance of the program can be enhanced in consideration of a degree of influence of the variable parameter on the performance of the program, and the like. It may regenerate a source program by using the variable parameter reflecting the variation of the variable parameter and the fixed parameter.

The processor may set the regenerated source program as the source program and perform the process/step described above again (S750). The processor may repeatedly perform the steps described above until the accumulated size of the data used for learning or the number of executions reaches a predetermined batch size (S760). That is, the machine learning model for outputting the variation of the variable parameter can be continuously trained, and the training data required for training may be generated or updated by repeatedly performing the steps described above until a predetermined batch size is reached.

Some or all intermediate results and data generated as the processes described above are repeatedly performed may be stored in any memory or any external storage device. In other words, the variation of the variable parameter, the variable parameter, the fixed parameter, the source program, the object program (e.g., binary code), the test input, the test output, the result value and/or the performance, which is generated as the processes described above are repeatedly performed until a predetermined batch size is reached, may be stored in any memory or external storage device. The data and/or information stored or collected in this way may be used as training data for reinforcement learning (e.g., global DNN) of other machine learning models.

Figure 8:
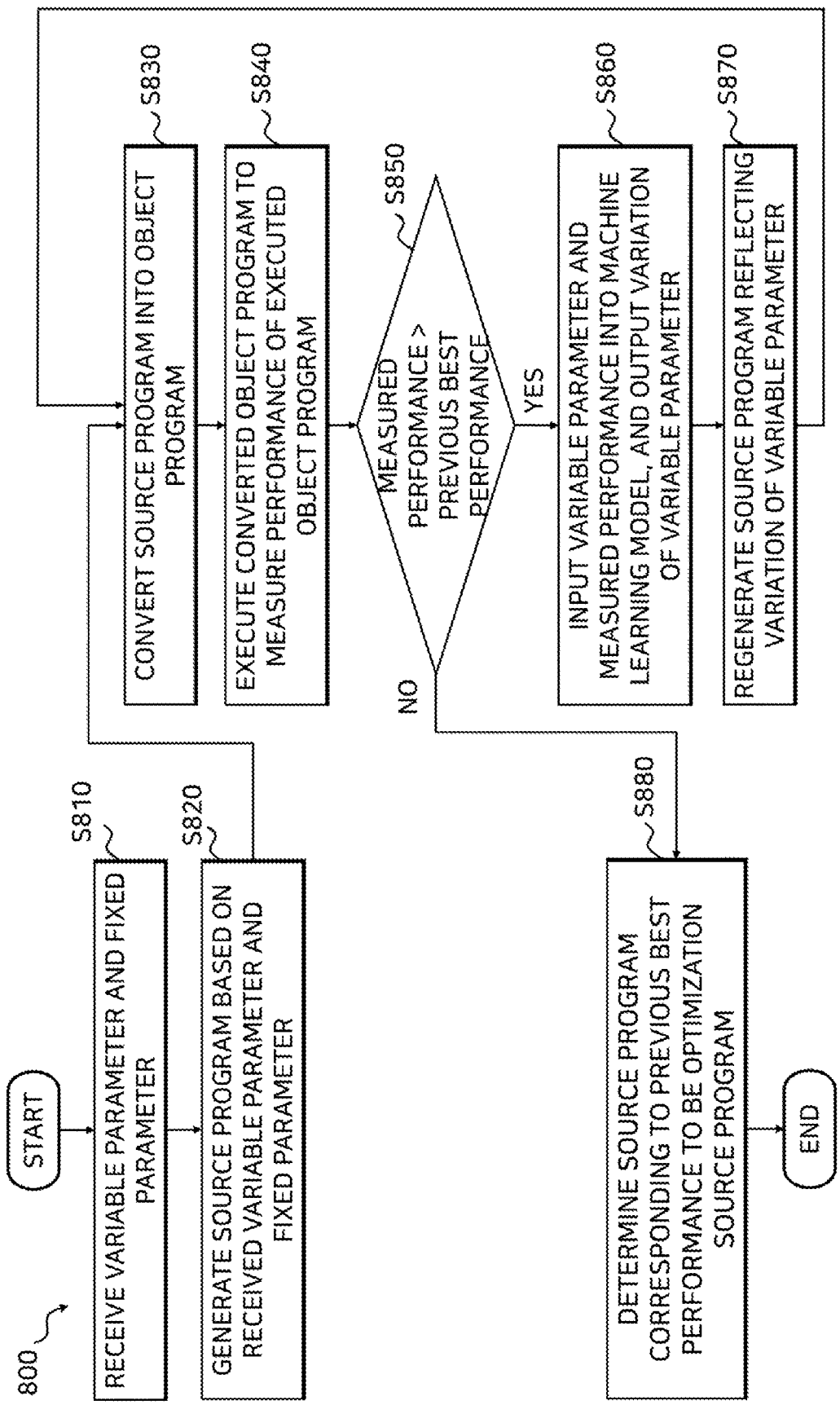
FIG. 8 is a flowchart illustrating an example of a method for inferring through a machine learning model.

FIG. 8 is a flowchart illustrating an example of a method 800 for inferring through a machine learning model. The method 800 for inferring the machine learning model may be performed by at least one processor (e.g., the processor 100) for performing program optimization. The method 800 for inferring the machine learning model may be initiated by the processor receiving an input for a source program including a variable parameter and a fixed parameter (S810). For example, the variable parameter and the fixed parameter may be directly received from a program developer, or may be extracted from a database storing the variable parameters and the fixed parameters.

The processor may generate the source program based on the received input (S820). In addition, the processor may convert the source program into an object program (S830). In this case, the process of generating the source program based on the fixed parameter and the variable parameter or converting the generated source program into the object program may be performed in the manner same as/similar to that described above.

The processor may execute the converted object program to measure the performance of the executed object program (S840). For example, an execution time required for the object program to output a result value from the input, an amount of energy consumed, and/or an amount of resource usage may be used as a performance index for measuring the performance of the program. That is, a program with a shorter execution time, less amount of energy consumed, and/or less amount of resource usage may be determined to have a better performance.

The processor may determine whether or not the measured performance of the program is higher than the previous best performance (S850). In other words, the processor may determine whether or not the performance of the program reaches a target performance. For example, if the program performances measured while repeatedly performing at least some of the processes described above are no longer enhanced, the processor may determine that the performance of the corresponding program reaches the target performance.

If it is determined that the measured performance is higher than the previous best performance, the processor may input the variable parameter and the measured performance to the machine learning model, and output the variation of the variable parameter (S860). In addition, the processor may regenerate the source program reflecting the variation of the variable parameter (S870). That is, the processor may continuously change the variable parameter and measure the change in the program performance according to the change of the variable parameter.

If the performance of the program reaches the target performance, the processor may determine a source program corresponding to the best performance to be an optimized source program (S880). That is, if the performance of the program is no longer enhanced from the previous best performance while repeatedly performing all or some of the processes described above, the processor may determine the source program corresponding to the best performance (program with a variable parameter corresponding to the best performance) better than the other performances obtained so far to be the optimized source program. With such a configuration, it is possible to automatically generate an optimized program by repeatedly performing the performance measurement until the processor reaches the target performance, without requiring a program developer to optimize the program by directly changing variable parameters. While FIG. 8 illustrates that the program corresponding to the previous best performance is generated to be the optimized program if the operation at S850 does not have one time of enhancement of performance of the program from the previous best performance (but aspects of the present disclosure are not limited thereto), and if all of the performances of the program measured while repeatedly performing the processes S830 to S850 a plurality of predetermined times do not exceed the previous best performance, the program corresponding to the previous best performance may be determined to be the optimized program.

Figure 9:
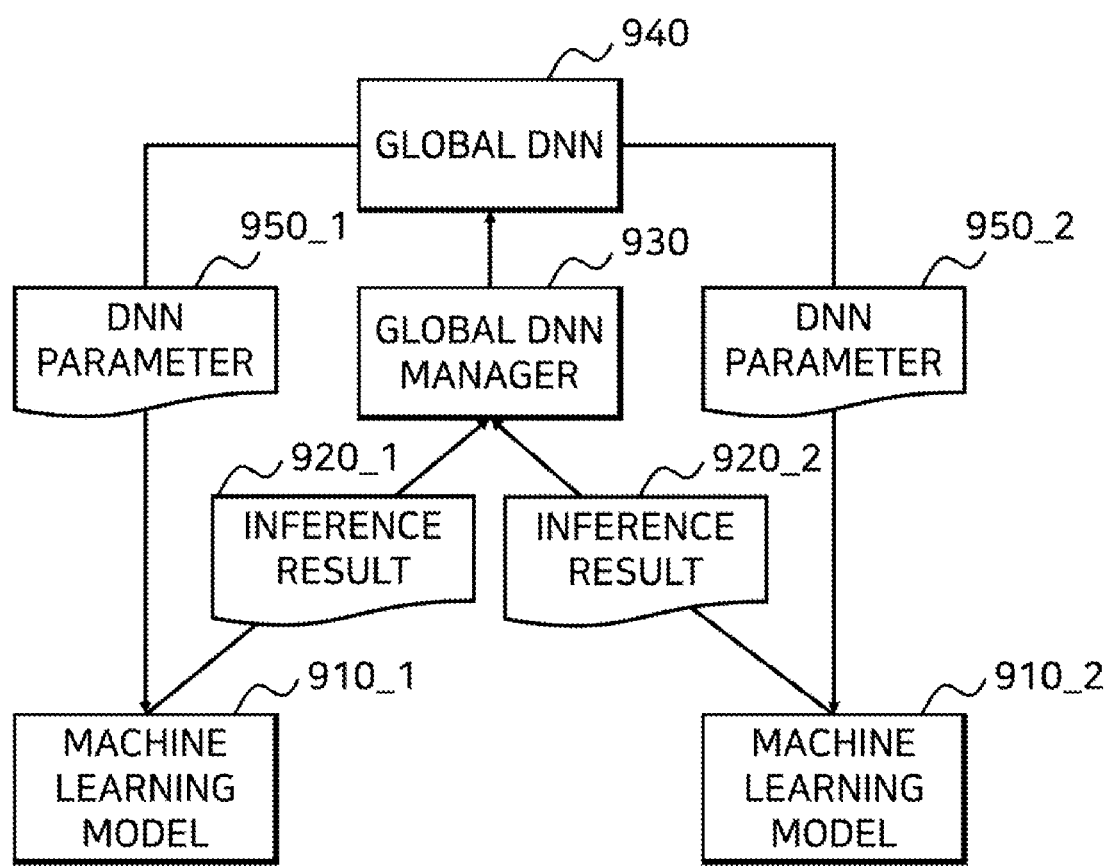
FIG. 9 is a diagram illustrating an example of performing reinforcement learning on a machine learning model.

FIG. 9 is a diagram illustrating an example of performing reinforcement learning on machine learning models 910_1 and 910_2. For example, FIG. 9 may illustrate a structure for training a global DNN 940 and the machine learning models 910_1 and 910_2 by using the reinforcement learning technique of the Asynchronous Advantage Actor-Critic (A3C) structure. In this case, the reinforcement learning may refer to a technique in which an agent based on DNN applies an action to an external environment and receives result (state) and reward, and repeatedly executes the processes of training the DNN with the state and reward again. There may be one or more machine learning models 910_1 and 910_2 that measure the program performance and output a variation of the variable parameter.

As described above, the machine learning models 910_1 and 910_2 may store the variation of the variable parameter, the variable parameter, the fixed parameter, the source program, the object program (e.g., program binary), the test input, the test output, the result value and/or the performance, and the like, which is generated while repeatedly performing the processes until a predetermined batch size is reached, in any memory or external storage device. As described above, data and/or information stored in any memory or external storage device may be provided to a global DNN manager 930 as inference results 920_1 and 920_2. For example, the inference results 920_1 and 920_2 may be asynchronously provided to the global DNN manager 930.

The global DNN manager 930 receiving the inference results 920_1 and 920_2 may generate training data for training the global DNN by using the inference results 920_1 and 920_2. The global DNN manager 930 may transmit the generated training data to the global DNN 940. That is, the global DNN 940 may perform reinforcement learning by using all of the inference results 920_1 and 920_2 generated by the one or more machine learning models 910_1 and 910_2.

The global DNN 940 may perform reinforcement learning by using the training data and generate DNN parameters 950_1 and 950_2 as a result of reinforcement learning. As described above, the generated DNN parameters 950_1 and 950_2 may be provided to the one or more machine learning models 910_1 and 910_2. In this case, parameters of the machine learning models 910_1 and 910_2 may be substituted with the received DNN parameters 950_1 and 950_2, and accordingly, reinforcement learning of the machine learning models 910_1 and 910_2 may be performed.

Although FIG. 9 illustrates that there are two machine learning models 910_1 and 910_2, aspects are not limited thereto, and there may be three or more machine learning models. In addition, although it is described that reinforcement learning is performed by using the A3C model with reference to FIG. 9, aspects are not limited thereto, and any Actor-Critic model, Deep Q Networks (DQN) model, or the like may be used.

The method described above may be provided as a computer program stored in a computer-readable recording medium for execution on a computer. The medium may be a type of medium that continuously stores a program executable by a computer, or temporarily stores the program for execution or download. In addition, the medium may be a variety of recording means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, and so on. In addition, other examples of the medium may include an app store that distributes applications, a site that supplies or distributes various software, and a recording medium or a storage medium managed by a server.

The methods, operations, or techniques of the present disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies according to design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the present disclosure, computer, or a combination thereof.

Accordingly, various example logic blocks, modules, and circuits described in connection with the present disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, and the like. The instructions may be executable by one or more processors, and may cause the processor(s) to perform certain aspects of the functions described in the present disclosure.

Although the examples described above have been described as utilizing aspects of the currently disclosed subject matter in one or more standalone computer systems, the present disclosure is not limited thereto, and may be implemented in conjunction with any computing environment, such as a network or distributed computing environment. Furthermore, the aspects of the subject matter in the present disclosure may be implemented in multiple processing chips or devices, and storage may be similarly influenced across a plurality of devices. Such devices may include PCs, network servers, and portable devices.

Although the present disclosure has been described in connection with some examples herein, various modifications and changes can be made without departing from the scope of the present disclosure, which can be understood by those skilled in the art to which the present disclosure pertains. In addition, such modifications and changes should be considered within the scope of the claims appended herein.

The invention claimed is:

1. A method for automatically optimizing a program based on reinforcement learning, the method comprising:
   receiving, by a computing device, an input for a source program, wherein the input includes a fixed parameter and a variable parameter;
   generating, based on the received input, the source program;
   converting the source program into an object program;
   executing the converted object program;
   measuring a performance of the executed converted object program;
   determining an input vector representing at least the variable parameter and the measured performance;
   inputting the input vector into a machine learning model;
   outputting, based on the inputting, a variation of the variable parameter; and
   regenerating, based on the fixed parameter and the variation of the variable parameter, a modified source program reflecting the variation of the variable parameter.

2. The method according to claim 1, wherein the regenerating comprises:
   updating the variable parameter by applying the variation of the variable parameter to the variable parameter; and
   outputting, by using the updated variable parameter and the fixed parameter, the regenerated modified source program.

3. The method according to claim 1, further comprising:
   after the regenerating the modified source program, setting the regenerated modified source program as the source program, and reperforming the converting, the executing, the measuring, the determining, the inputting, the outputting, and the regenerating.

4. The method according to claim 3, further comprising training the machine learning model by repeating the setting and the reperforming until a predetermined batch size is reached.

5. The method according to claim 3, further comprising:
   repeatedly performing, until a target performance is reached, at least one of: the converting, the executing, the measuring, the determining, the inputting, the outputting, or the regenerating; and
   after the target performance is reached, determining a regenerated source program corresponding to a best performance to be an optimized source program.

6. The method according to claim 1, wherein the inputting the input vector comprises inputting the variable parameter, the measured performance, and the source program into the machine learning model, and
   wherein the input vector represents the variable parameter, the measured performance, and the source program.

7. The method according to claim 6, wherein the machine learning model comprises a deep learning model, and
   the variation of the variable parameter comprise:
   determining an output vector representing the variation of the variable parameter through the deep learning model.

8. The method according to claim 1, wherein the executing comprises:
   measuring time taken to output a result value through the object program while the object program is executed; and
   determining the measured time to be an index of the performance.

9. The method according to claim 8, wherein the measuring the time comprises:
   inputting a test set for the object program; and
   wherein the measured time is based on time taken for a result value corresponding to the test set to be output through the object program.

10. The method according to claim 1, wherein the variable parameter comprises at least one of:
    a parameter associated with a set of macro variable declarations;
    a parameter associated with a kernel definition; or
    a parameter associated with a thread of a graphic processing unit (GPU).

11. A non-transitory computer-readable recording medium storing instructions that, when executed by one or more processors, cause:
    receiving an input for a source program, wherein the input includes a fixed parameter and a variable parameter;
    generating, based on the received input, the source program;
    converting the source program into an object program;
    executing the converted object program;
    measuring a performance of the executed converted object program;
    determining an input vector representing at least the variable parameter and the measured performance;

inputting the input vector into a machine learning model;
outputting, based on the inputting, a variation of the variable parameter; and
regenerating, based on the fixed parameter and the variation of the variable parameter, a modified source program reflecting the variation of the variable parameter.

12. The non-transitory computer-readable recording medium according to claim 11, wherein the instructions, when executed by the one or more processors, cause the regenerating by:
updating the variable parameter by applying the variation of the variable parameter to the variable parameter; and
outputting, by using the updated variable parameter and the fixed parameter, the regenerated modified source program.

13. The non-transitory computer-readable recording medium according to claim 11, wherein the instructions, when executed by the one or more processors, further cause:
after the regenerating the modified source program, setting the regenerated modified source program as the source program, and reperforming the converting, the executing, the measuring, the determining, the inputting, the outputting, and the regenerating.

14. The non-transitory computer-readable recording medium according to claim 13, wherein the instructions, when executed by the one or more processors, further cause:
training the machine learning model by repeating the setting and the reperforming until a predetermined batch size is reached.

15. The non-transitory computer-readable recording medium according to claim 13, wherein the instructions, when executed by the one or more processors, further cause:
repeatedly performing, until a target performance is reached, at least one of: the converting, the executing, the measuring, the determining, the inputting, the outputting, or the regenerating; and
after the target performance is reached, determining a regenerated source program corresponding to a best performance to be an optimized source program.

16. The non-transitory computer-readable recording medium according to claim 11, wherein the instructions, when executed by the one or more processors, cause the inputting the input vector by:
inputting the variable parameter, the measured performance, and the source program into the machine learning model, and
wherein the input vector represents the variable parameter, the measured performance, and the source program.

17. The non-transitory computer-readable recording medium according to claim 16, wherein the machine learning model comprises a deep learning model, and
wherein the instructions, when executed by the one or more processors, cause the outputting the variation of the variable parameter by:
determining an output vector representing the variation of the variable parameter through the deep learning model.

18. The non-transitory computer-readable recording medium according to claim 11, wherein the instructions, when executed by the one or more processors, cause the executing by:
measuring time taken to output a result value through the object program while the object program is executed; and
determining the measured time to be an index of the performance.

19. The non-transitory computer-readable recording medium according to claim 18, wherein the instructions, when executed by the one or more processors, cause the measuring the time by:
inputting a test set for the object program; and
wherein the measured time is based on time taken for a result value corresponding to the test set to be output through the object program.

20. The non-transitory computer-readable recording medium according to claim 11, wherein the variable parameter comprises at least one of:
a parameter associated with a set of macro variable declarations;
a parameter associated with a kernel definition; or
a parameter associated with a thread of a graphic processing unit (GPU).

* * * * *